March 7, 1939. E. P. COLLINS 2,149,936
FUMIGATION SYSTEM
Filed April 2, 1936
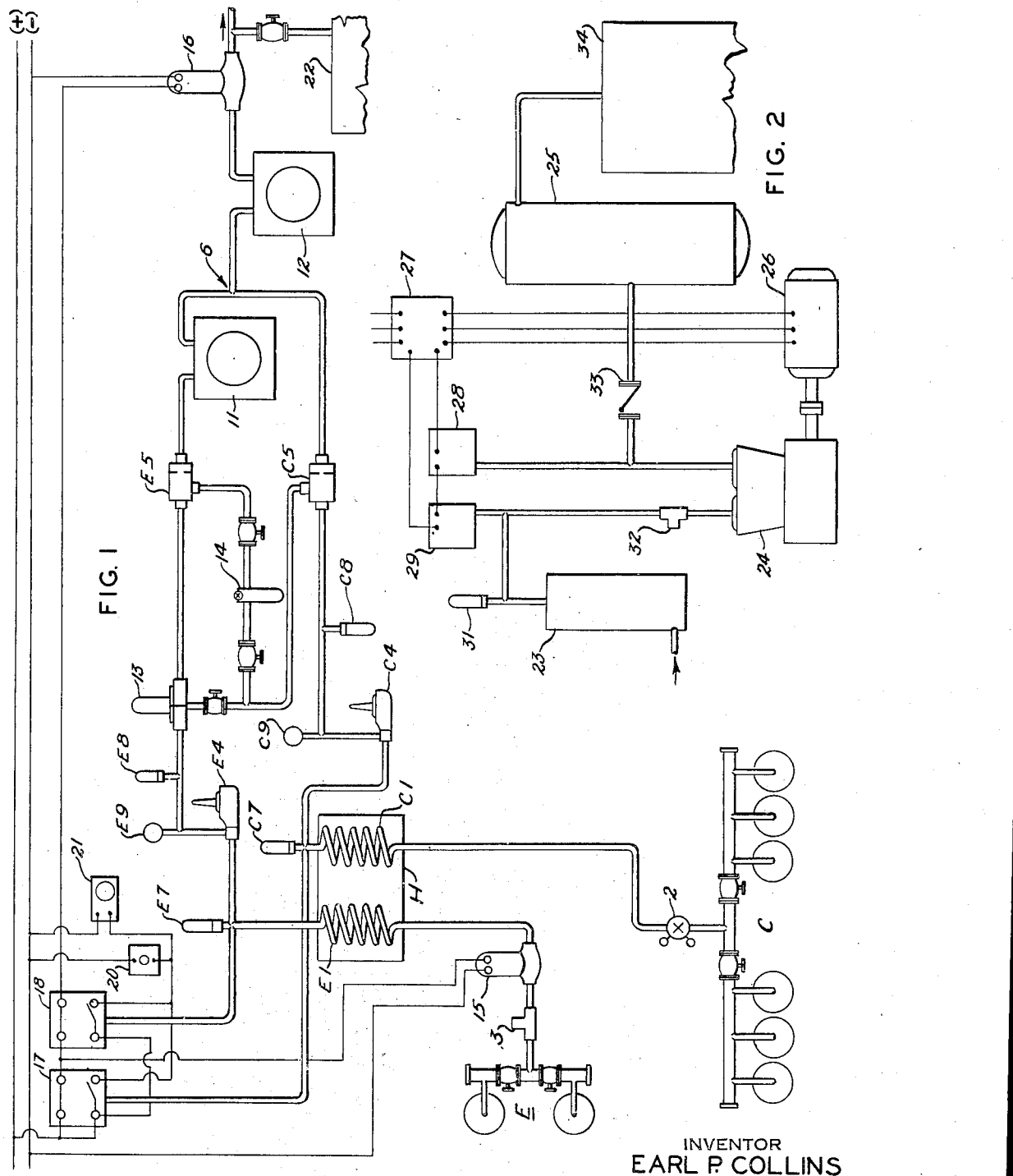
INVENTOR
EARL P. COLLINS
BY
ATTORNEY Patented Mar. 7, 1939

2,149,936

UNITED STATES PATENT OFFICE 2,149,936

FUMIGATION SYSTEM

Earl P. Collins, Little Neck, N. Y., assignor to Carbide and Carbon Chemicals Corporation, a corporation of New York Application April 2, 1936, Serial No. 72,262

6 Claims. (Cl. 21—108)

The invention relates to fumigation, including a system, in which the fumigating medium consists of a fluid mixture of two or more components. It is especially concerned with the provision, in such a system, of means to insure mixing in accurate and predetermined proportions a plurality of fluid constituents prior to introduction into the fumigating zone.

An important property in a commercially valuable fumigant is non-inflammability. Fluids which per se may be of flammable nature, although highly valuable because of their toxic character, are therefore often mixed with suitable proportions of another non-flammable fluid, to produce a safe and effective fumigant. Mixtures of two or more fluids have also been found to give improved insecticidal qualities over the same ones used individually. It is usually essential, however, when employing such mixtures to proportion accurately the constituent ingredients, in order to obtain most effective results. While various means have been suggested and tried to accomplish suitable proportionate mixing, many difficulties have been encountered, which are especially annoying when, as is usually the case, the fluid mixture components are widely separated in boiling point, vapor pressure, and other characteristics.

It is an object of this invention to provide a fluid mixture fumigation system which is generally applicable to the treatment of foodstuffs, tobacco, grain, or other materials, and economically useful where exposure is effected in an ordinary room, a warehouse, ships, or in atmospheric and vacuum chambers. A further object is to provide a system incorporating a reliable and accurate means for controlling the ratio of components in a fumigating mixture of two or more miscible or immiscible fluids, and conducting a homogeneous composition thereof to the fumigation zone. Another object is to provide a fumigating system containing automatic means for producing a predetermined non-flammable composition of a plurality of fluids, at least one of which is flammable, with a further provision for automatically preventing flow of the flammable component in the absence of suitable proportions of the non-flammable fluid. A still further object is to provide portable features in such a system, whereby safe and effective fumigation with fluid mixtures is more readily available.

Other objects and advantages in the invention will be apparent from a description of the accompanying drawing, showing diagrammatically one modification thereof.

Fig. 1 represents a system including means for directly passing the fluid mixture to the fumigation zone.

Fig. 2 shows an alternative method of distributing the fluid after mixture, especially adapted for fumigation under pressure.

The system shown is especially adapted for use with a fumigant mixture of ethylene oxide and carbon dioxide, in proportions which are non-flammable and of excellent insecticidal qualities. While the invention will be described as adapted to the use of these particular fluids, it is not limited in this respect, but is applicable to any analogous fluid mixture fumigants.

In Figure 1 there are shown associated together three distinct fluid flow systems, one for ethylene oxide, another for the carbon dioxide, and the third carrying the mixed gas to the point of fumigation. Both the ethylene oxide and carbon dioxide are readily available commercially, and in the source shown they are supplied in cylinders of these fluids, as represented at E and C respectively. The cylinders of each group are connected together through a suitable manifold. A regulator 2 reduces the pressure of the carbon dioxide to about 115 pounds per square inch before it passes to the heat exchanger H, whereas the ethylene oxide is filtered through the member 3, and reaches the heat exchanger in the liquid phase. The heat exchanger H consists of a suitable container of oil or other liquid maintained, preferably by a thermostatic control, within a temperature range of about 100° F. to 200° F., and the ethylene oxide in passing therethrough is vaporized. By passing through the coils E1 and C1 respectively, both fluids are introduced to the following portions of the system in gaseous form and at substantially the same temperature. They then flow respectively through the low pressure regulators E4 and C4, the metering orifices E5 and C5, to the T connection 6, where mixing of the two gases occurs. The members E7 and C7 are ordinary safety valves on the high pressure side of the system, and E8 and C8 are similar valves on the low pressure portion. Low pressure gages registering to about five pounds per square inch are represented by E9 and C9. In the ethylene oxide line, following the metering orifice E5, the flow meter 11 is inserted, which in conjunction with another meter 12 in the mixed gas line will indicate the ratio of flow of the respective fluids.

The metering members E5 and C5 are of the plate orifice type, in which the relative diameter of the orifices are adjusted to permit a volume flow of one part of ethylene oxide to nine parts of carbon dioxide. This mixture is non-flammable and of highly toxic qualities. To insure further the proper balance of fluid proportions, the differential pressure regulator 13 is inserted in the ethylene oxide line and connected across the two systems. This is of a diaphragm construction arranged with the orifice pressure of the carbon dioxide on the upper surface of the diaphragm and the ethylene oxide orifice pressure on the lower side. The regulator is adjusted to maintain a fixed relation between the orifice pressures of the ethylene oxide and carbon dioxide, the differential pressure being indicated on a suitable manometer 14. With proper adjustment of the regulator 13 and the orifice members E5 and C5, correct volume proportions of the two fluids will be indicated by the meters 11 and 12, which will show a fluid flow in the ratio of 1:10.

The system is also provided with automatic means for cutting off fluid flow entirely when either the ethylene oxide or carbon dioxide is exhausted, or for some other reason ceases to flow. The essential members of this portion of the system consist of the solenoid valves 15 and 16, one in the high pressure side of the ethylene oxide line, and the other in the mixed gas passage. These valves are in electrical circuit with the cut-out and signal members 17 and 18, which are pressure actuated switches of the double circuit, enclosed contact, mercury type. Also in this circuit are the flickering pilot light 20 and the bell 21, serving the purpose of alarm signals. The pressure switches 17 and 18 are in communication, as shown, with the carbon dioxide and ethylene oxide conduits respectively at points just ahead of the low pressure regulators C4 and E4.

With the electrical control functioning, the system so far described will operate in the following manner, beginning with conditions in which there is no gas in the system, and the pressure in all parts is at atmospheric. At this stage the contacts in the pressure switches 17 and 18 are closed, in the position making circuit to the signal light 20 and alarm bell 21. With the heat exchanger H at the proper temperature, carbon dioxide is admitted to the system through the manifold regulator 2, and passes through the heating coil C1. The pressure of this gas actuates the pressure switch 17 causing it to open its alarm circuit and to close its portion of the circuit operating solenoid valves 15 and 16. The carbon dioxide continues through the regulator C4, where pressure is reduced, through the metering orifice C5 and the mixed gas meter 12, and further flow is then stopped by the solenoid valve 16. Liquid ethylene oxide is then introduced, passes through the filter 3 and is permitted to flow through the solenoid valve 15 only after the pressure of carbon dioxide has actuated the pressure switch 17 as above described. The ethylene oxide then flows through the heating coil E1, where it is vaporized, and passes to the low pressure regulator E4, the metering orifice E5, the meter 11, and thence to the mixed gas line. The pressure of this gas, prior to being reduced in the regulator E4, actuates the pressure switch 18 causing the alarm circuit to open, and closing its respective circuit to the solenoid valve 16. At this moment the latter valve becomes energized and is opened, permitting the gas mixture to pass, and continue its course as hereinafter described. It will be noted that by this control means, the flammable ethylene oxide will not flow unless there is a predetermined pressure of carbon dioxide available, and neither fluid can leave the mixing system until the proper non-flammable mixture of the two has been formed.

As previously mentioned the fluid mixture after passing the solenoid valve 16 may be led directly to the point of fumigation, such as a chamber 22, or other space where exposure is effected under substantially atmospheric pressure. In the preferred arrangement, shown in Fig. 2, the mixture passes into a surge tank 23, through a compressor unit 24, to an accumulator tank 25, from which the fumigant may be passed to the fumigation chamber 34 or held in storage under pressure for further use as desired. The motor 26 of the compressor unit is in electrical circuit with the motor starter 27, a pressure switch 28, and a vaporstat or low pressure switch 29, the latter members providing automatic operation of the compressor. With the solenoid valve 16 energized and in open position the gas mixture passes to the surge tank 23, and enters the suction line of the compressor. This exerts sufficient pressure on the vaporstat 29 to close its part of the energizing circuit of the starter relay 27, which in turn closes the circuit to the motor 26, starting the compressor 24. The compressor will continue to deliver the gas mixture to the accumulator 25 until the pressure therein builds up sufficiently to operate the pressure switch 28, at which time this member will open the energizing circuit of the starter relay 27, and cause the motor to stop. Similarly, the compressor will again start automatically when the accumulator pressure falls below a predetermined minimum. Whenever flow of the gas mixture to the suction line of the compressor is stopped, through closing of the solenoid valve 16, or the pressure thereof drops below the cut-in setting of the low pressure switch 29, this member will also break the motor circuit. In this manner the compressor will not operate unless there is a normal fluid flow from the gas mixing portion of the system, and excessive motor operation is prevented when no mixed gas is available. A safety valve 31, a gas filter 32, and a check valve 33 are also included in the compressor system, each of which operates and functions in a well known manner.

The various members of the system may be mounted and supported in any desirable manner, but I preferably arrange that section of the apparatus between the cylinder manifolds and the compressor unit, including the solenoid mixed gas valve 16, as a portable unit. By mounting these members in a metal, heat retaining cabinet, with suitable vents for the safety valves and regulators, an integral rigid construction has been assembled, which may be readily transported to any point of use. Commercial cylinders of both fluids being readily available, the system is therefore adapted to a wide application for fumigating purposes with improved economies in fluid consumption.

Modifications in the particular apparatus described will be apparent within the scope of the invention. The temperature of the heat exchanger H may, for example, be electrically controlled in the same circuit with the pressure switches 17 and 18, and associated solenoid valves, whereby no fluid is permitted to flow unless there is temperature sufficient to insure complete vaporization of the ethylene oxide. Normally about 105° F. is sufficient for this purpose, and the temperature should not exceed about 200° F. It may also be found desirable to substitute for the metering orifices E5 and C5 a Venturi type of mixer, in which the flow of carbon dioxide will aspirate suitable proportions of ethylene oxide to form the desired composition. As previously mentioned no limitation should be placed on the nature of the fluid components, as any mixture of two or more fluids, in which, for the purpose of non-flammability or insecticidal qualities, a close control of constituent proportions is essential, may be advantageously employed in this fumigation system.

The invention should not be limited other than as defined in the appended claims.

I claim:

1. In a fumigation system employing a fumigant mixture of ethylene oxide and carbon dioxide, means for effecting and maintaining a homogeneous mixture of predetermined relative proportions of the two fluids, which comprises a separate source for each fluid, pressure regulated conduits from each source to a common mixing T, means heating said conduits to vaporize the ethylene oxide and heat both fluids to substantially the same temperature, means in each fluid conduit including orifice members for maintaining a constant volume flow in said predetermined relative proportions, and a conduit from said mixing T containing a valve operable automatically to prevent flow of fluid mixture to the fumigating zone in other than said predetermined relative proportions of each fluid component.

2. In a fumigation system employing a fumigant mixture of ethylene oxide and carbon dioxide, means for effecting and maintaining a homogeneous mixture of predetermined relative proportions of the two fluids, which comprises a separate source for each fluid, pressure regulated conduits from each source to a common mixing T, means heating said conduits to vaporize the ethylene oxide and heat both fluids to substantially the same temperature, means in each fluid conduit including orifice members and a differential pressure regulator associated therewith for maintaining a relative volume flow of ethylene oxide and carbon dioxide in substantially the ratio of 1:9, and a conduit from said mixing T containing a solenoid valve energized to permit flow of fluid mixture to the fumigating zone only when said relative proportions of each fluid component is available at the mixing T.

3. A fumigation system of the type employing a mixture of a plurality of fluids including flammable and non-flammable components, which comprises a separate source for each fluid component, conduits from each source to a common mixing point, pressure reducing regulators in each conduit, means in the low pressure side of each conduit adapted to maintain volume flow of each fluid in predetermined relative non-flammable proportions, a conduit from said common mixing point to the fumigating zone, and valve means in said latter conduit operative automatically to prevent all fluid flow when any one component ceases to flow.

4. A fumigation system of the type employing a mixture of a plurality of fluids including flammable and non-flammable components, which comprises a separate source for each fluid component, conduits from each source to a common mixing point, pressure reducing regulators in each conduit, orifice members in the low pressure side of each conduit adapted to maintain volume flow of each fluid in predetermined relative non-flammable proportions, a conduit from said common mixing point to the fumigating zone, and a solenoid valve in said latter conduit energizable to permit the fluid mixture flow only when the predetermined relative proportions of each fluid component is available at said mixing point.

5. A fumigation system of the type employing a fluid mixture of ethylene oxide and carbon dioxide, which comprises a separate source for each fluid, conduits from each source to a common mixing point, pressure reducing regulators in each conduit, orifice members in the low pressure side of each conduit, a differential pressure regulator in connection with both conduits prior to said orifices and operative in conjunction therewith to maintain volume flow of each fluid in relative non-flammable proportions, a conduit from said common mixing point to the fumigating zone, and valve means in said latter conduit operative automatically to prevent flow of fluid mixture in other than said non-flammable proportions of each fluid component.

6. A fumigation system of the type employing a fluid mixture of ethylene oxide and carbon dioxide, which comprises a separate source for each fluid, conduits from each source to a common mixing point, a common heat exchanger for said conduits adapted to vaporize the ethylene oxide and heat both fluids to substantially the same temperature, pressure reducing regulators in each conduit, orifice members in the low pressure side of each conduit, a differential pressure regulator in connection with both conduits prior to said orifices and operative in conjunction therewith to maintain volume flow of each fluid in relative predetermined non-flammable proportions, a conduit from said common mixing point to the fumigating zone, and valve means in said latter conduit operative automatically to prevent flow of fluid mixture in other than said predetermined relative non-flammable proportions.

EARL P. COLLINS.